United States Patent [19]

Tsunoda et al.

[11] Patent Number: 4,689,535
[45] Date of Patent: Aug. 25, 1987

[54] CONCEALED WIPER SYSTEM

[75] Inventors: Akira Tsunoda; Takahiko Tanaka; Noboru Handa, all of Shizuoka, Japan

[73] Assignee: ASMO Co., Ltd., Kosai, Japan

[21] Appl. No.: 812,508

[22] Filed: Dec. 23, 1985

[30] Foreign Application Priority Data

| Dec. 26, 1984 | [JP] | Japan | 59-197192[U] |
| Jan. 20, 1985 | [JP] | Japan | 60-5551[U] |
| Jan. 20, 1985 | [JP] | Japan | 60-5553[U] |
| Jan. 20, 1985 | [JP] | Japan | 60-5554[U] |
| Jan. 20, 1985 | [JP] | Japan | 60-5555[U] |

[51] Int. Cl.$^4$ ............................................. B60S 1/08
[52] U.S. Cl. ..................................... 318/443; 318/444; 318/DIG. 2; 15/250.17
[58] Field of Search ......... 318/443, 444, 445, DIG. 2; 15/250 C, 250.02, 250.04, 250.13, 250.16, 260.17; 307/9, 10 R

[56] References Cited

U.S. PATENT DOCUMENTS

| 4,375,610 | 3/1983 | Nagaoka et al. | 318/444 |
| 4,588,935 | 5/1986 | Kaneiwa et al. | 318/483 |

FOREIGN PATENT DOCUMENTS

| 55-102751 | 8/1980 | Japan | 318/443 |
| 58-61044 | 4/1983 | Japan | 318/443 |
| 58-67543 | 4/1983 | Japan | 318/443 |
| 58-71243 | 4/1983 | Japan | 318/443 |
| 58-112854 | 7/1983 | Japan | 318/443 |
| 58-170654 | 10/1983 | Japan | 318/443 |

Primary Examiner—William M. Shoop, Jr.
Assistant Examiner—Bentsu Ro
Attorney, Agent, or Firm—Burns, Doane, Swecker & Mathis

[57] ABSTRACT

This concealed wiper system comprises a wiper motor (1) having a mechanism to house the wiper arm in the retracted position by reversing rotation of the wiper motor; an oscillator (50) in which the oscillation frequency is varied by means of a variable resistor (59) installed within the automobile compartment; a wiper actuation switch (3) for wiper actuation selection; a wiper motor-position detector (2) for detecting wiper motor output shaft position; a wiper motor drive circuit (6) for driving the wiper motor; and an intermittent actuation control device employing a microcomputer (5).

Intermittent actuation is selected by means of said wiper actuation switch (3), the intermittent pause period is based upon signals from said wiper motor-position detector (2) and signals from said means of oscillation (50), said wiper motor drive circuit (6) is controlled by the microcomputer (5).

10 Claims, 14 Drawing Figures

|  | 2A | 2B |
|---|---|---|
| OFF POSITION | L | L |
| INTERMITTENT POSITION | H | L |
| REVERSE POSITION | L | H |
| MEDIAN POSITION | H | H |

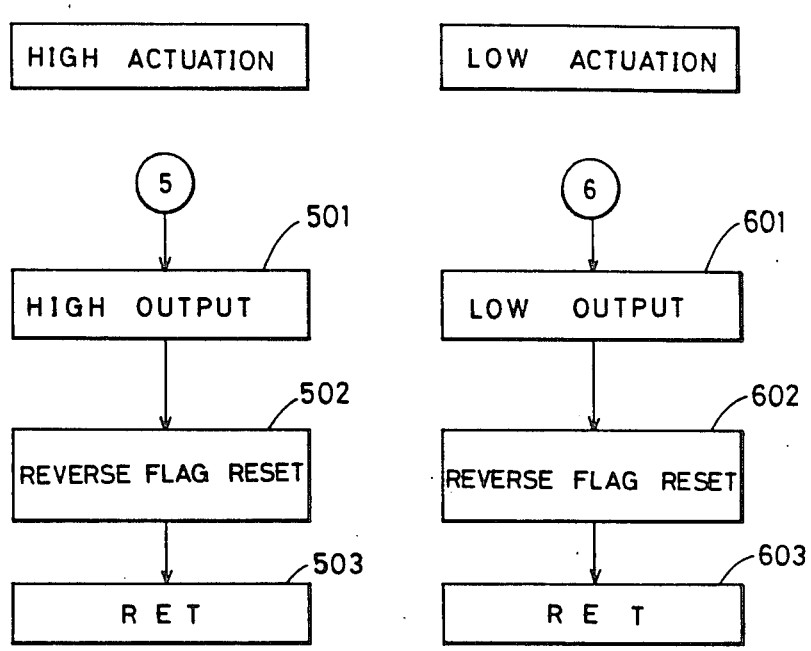

CONCEALED WIPER SYSTEM

BACKGROUND OF THE INVENTION

The present invention relates to a concealed wiper system applicable for use with vehicles wherein the wiper has a mechanism to house the wiper blade in the retracted position by reversing rotation of the wiper motor, more paticularly, it relates to new composition of an intermittent actuation wiper device, a speed sensitive intermittent windshield wiper control, a washer interlocked windshield wiper control, a device to cancel the housing in the winter, and a protection device from wiper motor overload, in said concealed wiper system.

DESCRIPTION OF THE PRIOR ART

In existing intermittent wiper devices in which the intermittent pause period can be varied, the desired intermittent pause period is recorded within the microcomputer memory and is operated by means of a switch or similar device controlled by the vehicle operator (Japanese Patent Publication No. 83-171756). A limitation of the existing device is the necessity for the operator to reset the intermittent pause period when restarting the vehicle due to loss of memory content when the power source to the microcomputer is cut at the time the vehicle is stopped.

A device to eliminate the aforementioned limitation has been proposed (Japanese Pat. publication No. 83-171758) wherein multiple pause periods may be selected by means of a pause period selection switch. This device can select various oscillation frequencies by means of a combination of oscillators and variable resistors whereby the oscillation signal of the selected frequency is converted to a corresponding voltage by means of a frequency-voltage converter, said voltage being controlled by a microcomputer and compared with a reference voltage by means of a comparator to determine the intermittent pause period. The aforementioned device possesses the limitation of requiring a comparator which can select a prescribed number of intermittent pause periods, and possesses the further limitation of requiring a frequency-voltage converter device. A still further limitation of the aforesaid device is that it cannot continuously create intermittent pause periods the duration of which correspond to the volume of rainfall, or a vehicle speed.

In motor vehicles possessing devices wherein washing solution is discharged by means of a switch to clean dirty windshields, it is desirable from the standpoint of safety that said operation require as little attention from the vehicle operator as possible, and that the discharge of washing solution be linked to the wiping action during wiper operation. In existing windshield wiper control systems utilizing similar washer interlocked functions, an RC timer circuit consisting of a condenser and resister is actuated by means of a signal from a washer switch, whereupon a wiper motor actuation relay is excited for a few seconds during the RC timer circuit timing period, and the wiping actuation is conducted (see Patent Gazette No. 54-34973, 1979; or Utility Model Gazette No. 55-51643, 1980).

In the existing systems utilizing the RC timer circuit, the timing periods, for every system, are dispersed due to dispersion of the condenser capacity and resistance value elements, and the effects of voltage and temperature also cause variations in the timing period. Thus, the wiper's wiping frequency during the washer interlocked actuation period is unstable and subject to variation. A further limitation includes variations in wiper rotation speed due to friction between the wiper blade and the windshield glass which leads to variations in the wiper's wiping frequency during periods of interlocked actuation.

Existing concealed wipers, in which the wiper arm and wiper blade are housed within the vehicle body, are suitable because they do not impede driver's field of vision when not in use, however, during the winter season falling snow accumulates in the gap between the base of the wiper arm housing and the external section thereof, said accumulated snow freezes during the night and wiper arm movement is impeded, immobilizing the wiper arm in the housing, and leading to concern it may cause wiper motor burnout. To eliminate this limitation, a function which can override the housing action during the winter is desirable. A device realizing said function has been proposed (Patent Gazette No. 54-34937, 1979) which provides multiple sets of connectors connecting the wiper motor unit and the control unit, wherein by selecting and combining various connectors, the wiper device housing action is effected or overridden.

One limitation of this device is the necessary replacement of nearly 10 lead wires connected to connectors, said replacement being troublesome. Use of a transfer switch rather than a connector has been contemplated, however, in cut-over it is necessary to switch the connections for multiple lead wires which carry the wiper motor current and solenoid current. Further limitations include the necessity of multiple contacts in the transfer switch, and contact capacities must be large. A still further limitation concerns their comparatively infrequent use due to their large size and cost.

When wiper arm movement is obstructed by extraneous foreign matter and an overload occurs in the wiper motor, the continued application of electric current produees the possibility of washer motor burnout. Heretofore, to protect the wiper motor from this type of occurrence, motor circuits and bimetal utilizing circuit breakers connected in series have been incorporated within said wiper motor. When the load becomes too great and the motor's current increases abnormally, the motor circuit is broken.

A limitation of this construction is the requirement of a circuit breaker within the wiper motor, because a bimetal composition is utilized, the load conditions during circuit breaker actuation are affected by external temperature and motor temperature, resulting in aberrant performance. A further limitation is the greatly dispersed recovery time due to external temperatures. A still further limitation is the increasingly complicated construction as extra contacts become necessary in the circuit breaker in order to notify the vehicle operator of circuit breaker actuation.

SUMMARY OF THE INVENTION

Accordingly, it is an object of the present invention to provide a concealed wiper system having several functions necessitated for practical use, which is simply constructed and inexpensive to manufacture.

Another object of the invention is to provide a concealed wiper system wherein the vehicle operator can optionally determine an intermittent pause period, and wherein once the intermittent pause period have been determined, the determined values are maintained even when the power source is cut.

Another object of the present invention is to provide a concealed wiper system wherein the intermittent pause period can be automatically varied in accordance to vehicle speed and based upon the operator-determined intermittent pause period.

This invention has as an another object the provision of a concealed wiper system, wherein washing solution discharge is reliably interlocked with the wiper's wiping action.

This invention has as still another object the provision of a concealed wiper system, which can override the housing function by means of a simple switch operation.

It is still another object of the present invention to provide a concealed wiper system wherein protection is particularly provided from wiper motor overload without requiring attachment of a circuit breaker to the wiper motor.

It is further object of the invention to provide a concealed wiper system wherein notification to the vehicle operator at time of overload of the wiper motor is simply realized.

Other and further object of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 10 shows a flow chart of the high speed actuation sub-routine.

FIG. 11 shows a flow chart of the low speed actuation sub-routine.

Figure 14:
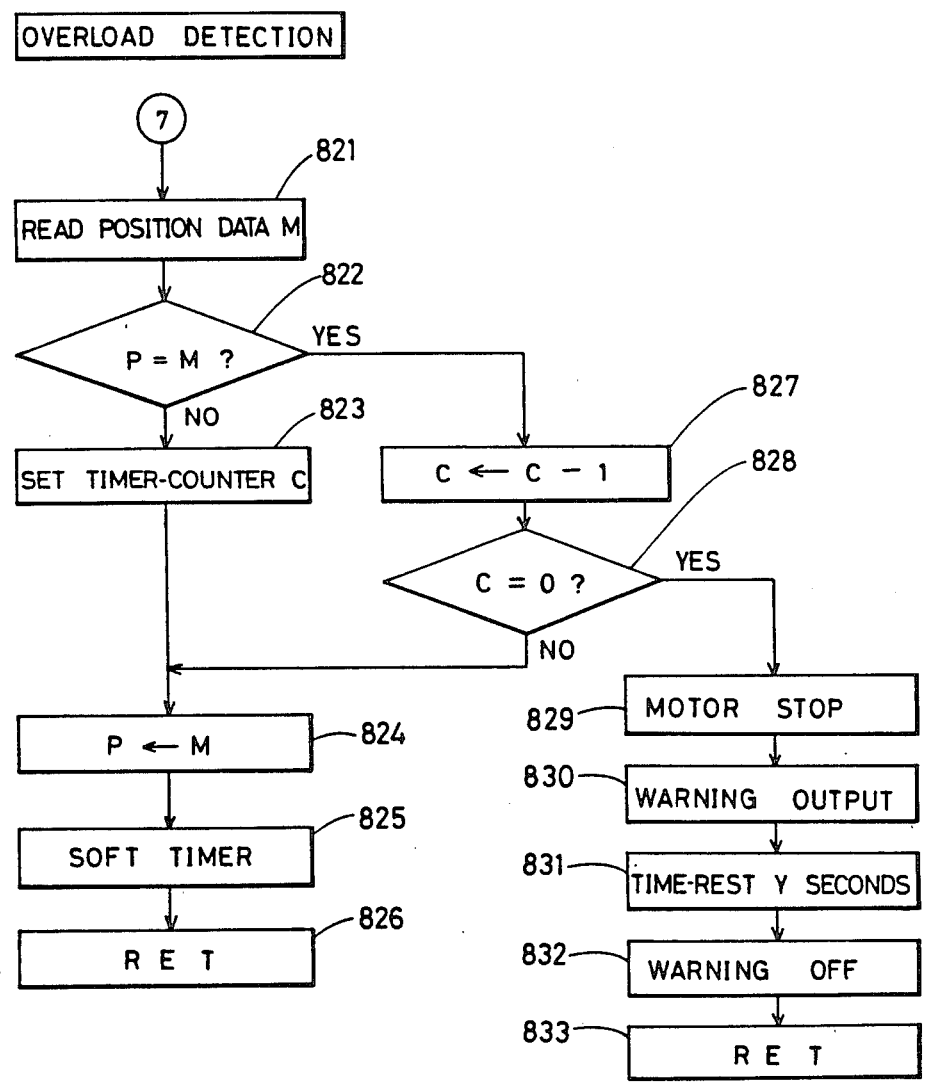

And, FIG. 14 is a flow chart showing the another overload detection sub-routine.

DETAILED DESCRIPTION OF PREFERRED EMBODIMENTS

Figure 1:
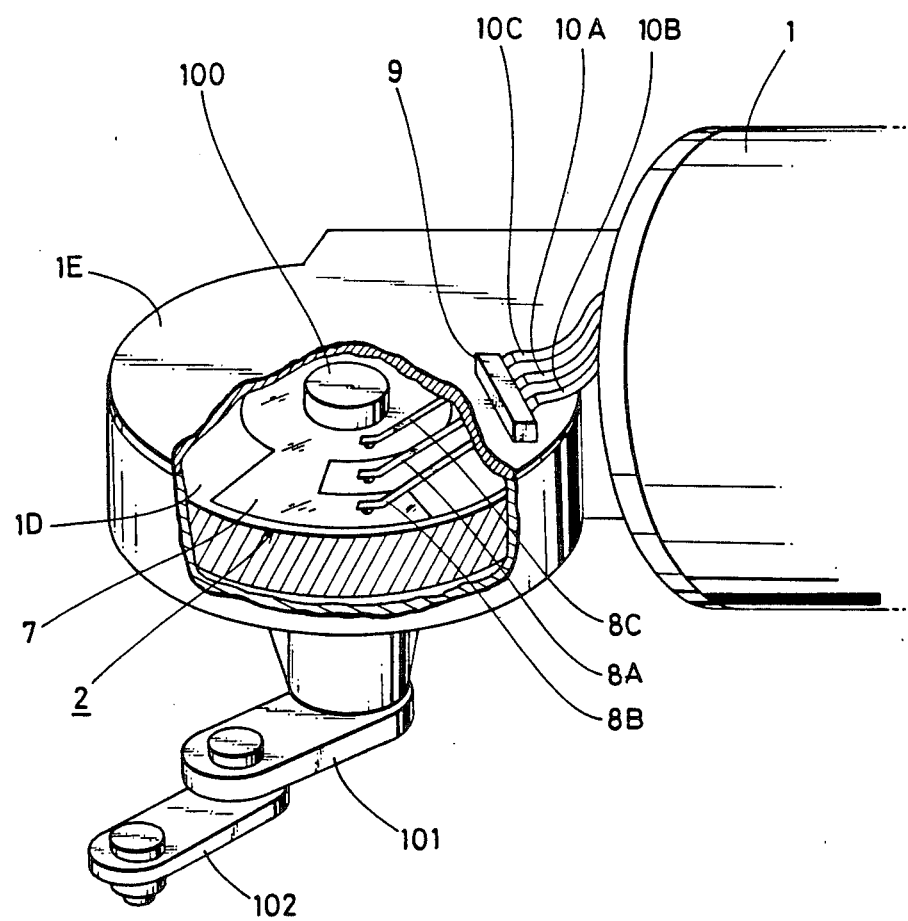
FIG. 1 presents a perspective, partial cutaway view of the wiper motor in the wiper system of the invention.

Herewith is described using drawings an embodiment of the presently proposed system. The wiper motor position detector 2 in this embodiment, as seen from FIGS. 1 and 2, consists of the motor gear 1D made of synthetic resin in the final reduction stage of wiper motor 1, the pattern plate 7 (metal) fastened to the side of said motor gear, and the contact levers 8A, 8B and 8C on the front of said pattern plate 7 the protruding ends of which, under their own spring action, make suitable contact under oscillating contact movement. These contact levers are secured to gear cover 1E by means of contact bush 9, and each of the levers is connected with lead wires 10A, 10B and 10C, respectively.

Pattern plate 7 is formed by the three zones ZA, ZB and ZC consisting of concentric circles with different radii; two zones (ZA, ZB) form a part of a circle, while the other zone (ZC) is a circle itself. The three zones (ZA, ZB, ZC) form one body so as to interconnect. The contact levers 8A and 8B are arranged so that they have different radial positions in relation to the center of wiper motor 1 output shaft 100, making it feasible for the respective zones ZA, ZB and ZC on the motor gear 1D flank to be contacted with oscillation. The other contact lever, 8C, is positioned radially so that contact can be made with the circular zone ZC under osciallation. Also, contact lever 8C is grounded through the lead wire 10C, and pattern plate 7 is given either a negative or a positive potential. Thus, pattern plate 7 and contact levers 8A and 8B form a switch system to open and close in terms of the ratational position of the output shaft 100 in the wiper motor 1. Thus, the protruding end of contact levers 8A and 8B, respectively, form contact 2A and 2B, respectively, of the wiper position detector. On the front of pattern plate 7 and the motor gear 1D is grease lubrication to reduce friction by contact lever 8A, 8B and 8C.

Figures 2, 3:
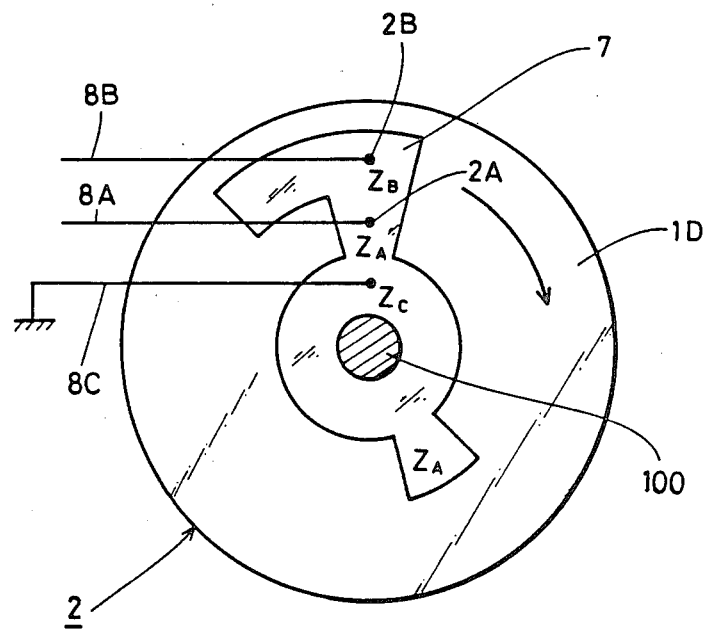
FIG. 2 is a plane view of a wiper motor position detector of the wiper motor.
FIG. 3 gives a table of a signal outputs of the position detector.

The condition (see FIG. 2) in which contact 2A and 2B each are in contact with the front of pattern plate 7 is in correspondence with the wiper motor 1 being at the retracted stop OFF position, and with both contact 2A and 2B in the low (L) potential state. Motor gear 1D turns rightward as seen in the figure along with rotation of the motor output shaft 100. When only contact 2A makes contact with the flank of motor gear 1D, this corresponds to the wiper motor 1 intermittent pause position, and contact 2A is in the high (H) potential state. But when the motor gear 1D turns 180 degrees rightward, only contact 2B comes in contact with the flank of motor gear 1D, in which condition the wiper motor 1 is in the reverse position, with contact 2B in the high (H) potential stage. And when contact 2A and 2B both contact the flank of the motor gear 1D, the wiper motor 1 is in the median position, with both contact 2A and 2B in the high (H) potential state. In said median position, the wiper performs its sweeping action. In FIG. 3 is a table indicating signal outputs summarizing operations of the position detector 2.

Using said position detector 2, we herewith describe the housing operations, the intermittent operations and other several operations well performed by the wiper system in FIGS. 4 through 14.

(CIRCUIT DESCRIPTION)

Figure 4:
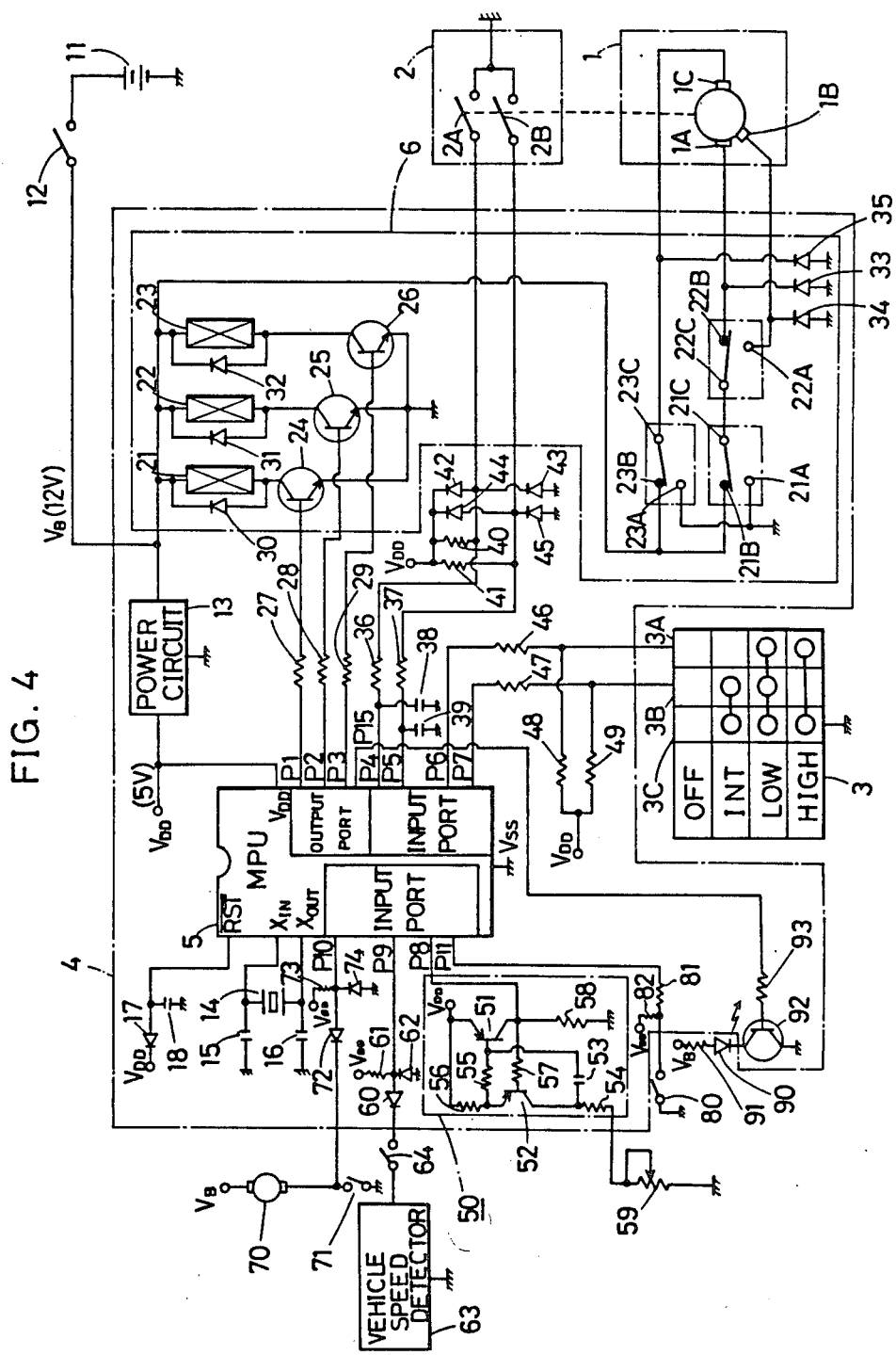
FIG. 4 is a circuit diagram of the concealed wiper system.

In FIG. 4, the wiper motor which drives the wiper is a motor equipped with a reduction gear, and said motor incorporates a position detector 2 for a windshield wiper enabling it to detect the output shaft position. Said wiper motor 1 is a DC type with three brushes (low-speed brush 1A, high-speed brush 1B, and common brush 1C). By brush selection switching one can choose two modes of operation, either at low or high speed.

Position detector 2 is a switch which opens and closes in accordance with the position of the output shaft 100, of wiper motor 1, and it has contacts 2A and 2B. Said contacts, as described earlier, are arranged to be both closed in the output shaft retracted stop position, open and closed in the intermittent pause position, closed and open in the reverse position, and both open in the median position other than the above three positions. Position detector 2 can output two-bit position signals for the output shaft position.

Wiper actuation switch 3 is a four-way switch settable to retracted stop actuation (OFF), intermittent actuation (INT), low-speed actuation (LOW), and high-speed actuation (HIGH). In terms of the selection as seen in the figure, terminal 3A, 3B and 3C open and close in relation to each other as follows: OFF position (open, open), INT position (open, closed), LOW position (closed, closed), HIGH position (closed, open). The wiper actuation switch 3 can be set to the given position by means of two-bit selected signal outputs.

Control unit 4 has the microcomputer 5 and the wiper motor drive circuit 6.

Microcomputer 5 is a conventional control-type computer incroporating a read-only memory (ROM), and random access memory (RAM), and input/output ports. In accordance with a predetermined program, the microcomputer computes, calculates and compares so as to control the wiper motor drive circuit 6.

In the wiper motor drive circuit 6 within the control unit 4, the vehicle voltage VB (12 V) is supplied by the automotive power source battery 11 via the key switch 12. The voltage in the microcomputer 5 is supplied through the power circuit 13, converting the vehicle voltage VB (12 V) into logic citcuit voltage VDD (5 V).

Connected within microcomputer 5 is a clock circuit formed by the crystal oscillator 14 (frequency of several MHz) and the condensers 15 and 16, which serve to stabilize the oscillations. This clock emits the basic clock signals. Then, a reset circuit consisting of diode 17 and condenser 18 is connected, so that when the power is put on with key switch 12 a low level (LOW) reset signal is generated.

Wiper motor drive circuit 6 is provided with forward drive relay 21, high-speed changeover relay 22, and reserse drive relay 23. Relay 21, 22 and 23, respectively, are connected by the coil end to the vehicle power source VB (12 V), with the other end connected to transistor 24, 25 and 26, respectively. Each transistor 24, 25 and 26 has an emitter connected in the ground; the base is respectively hooked up via resistors 27, 28 and 29 to the microcomputer output port P1, P2 and P3. In each relay coil 21, 22 and 23 is connected in parallel adsorbance diodes 30, 31 and 32.

Normally closed terminal 21B and 23B of forward drive relay 21 and reverse drive relay 23 contacts are both connected up to the vehicle power source VB (12 V), and the normally open terminal 21A and 23A of relay 21 and 23 are both grounded. The common terminal 21C of the forward drive relay 21 is connected to common terminal 22C of the high-speed changeover relay 22 contact; relay 22 normally closed terminal 22B is connected to the low-speed brush 1A of wiper motor 1, while relay 22 normally open terminal 22A is connected to high-speed brush 1B. Common bruch 1C is connected to common terminal 23C of relay 23 contact. Since surge voltage generated when the wiper motor 1 is put on and off must escape, diodes 33, 34 and 35 are connected between brush 1A, 1B, 1C and the ground.

Herewith follows a description of the operation of wiper motor drive circuit 6. When microcomputer 5 output P1, P2 and P3 are all put at low (L) level (L, L, L), transistor 24, 25 and 26 all go off, none of relays 21, 22 and 23 is energized, and as seen from FIG. 4 low-speed brush 1A and common brush 1C are shorted through normally closed terminals 21B, 22B and 23B of the three relays 21, 22 and 23, making the wiper motor come to a stop. Should this condition occur when the wiper motor 1 is working, armature current flows due to reverse voltage and dynamic braking takes place.

When the output port P1 is put at high level (H) and output port P2 and P3 are both put at low level (L) (i.e., H, L, L), only transistor 24 is in the ON condition, only relay 21 is energized, and its contacts between terminal 21A and 21C close, grounding low-speed brush 1A and making the wiper motor 1 turn in the forward direction.

With output port P1, P2 and P3 at the H, H and L positions, respectively, relay 21 and 22 are energized, terminal 21C and 22C are closed with terminal 21A and 22A, grounding high-speed brush 1B and making wiper motor 1 turn in the forward direction at high speed.

With output port P1, P2 and P3 at the L, L and H positions, respectively, only relay 23 is energized, terminal 23A and 23C are closed and common brush 1C is grounded. Thus, low-speed brush 1A is connected up to the vehicle power source VB via the normally closed terminal 21B and 22B of relay 21 and 22, so the wiper motor 1 turns in the reverse direction at low speed.

Position detector 2 has only one end of its two switch contact terminals 2A and 2B grounded; the other end is connected through resistor 36 and 37 as well as condenser 38 and 39 of the chattering absorbance circuit to input port P4 and P5, respectively, of microcomputer 5. In the signal line from contact 2A and 2B to input port P4 and P5, to assure that a high-level voltage (H) is maintained in the signal line whenever contact 2A and 2B are open, pull-up resistor 40 and 41 are connected in, as well as clamping diode 42, 43, 44 and 45 are connected in to release any noise voltage induced by the wiper motor 1.

Then, with contact 2A and 2B open and closed (i.e., in accordance with the position of wiper motor 1 output shaft 100), the two-but position signal is inputted by input port P4 and P5, at the retracted stop (OFF) position (L, L), the intermittent pause position (H, L), the reverse position (L, H), or some other median position (H, H).

As indicated earlier, wiper acutuation switch 3 is a switch to start and end actuation, its terminal 3C is grounded, and terminal 3A and 3B are connected to input port P6 and P7 of microcomputer 5 via resistor 46 and 47, respectively, as well as being hooked up to pull-up resistor 48 and 49. In terms of the wiper actuation switch setting, two-bit selected signals are inputted by input port P6 and P7 at the retracted stop (OFF) position (H, H), the intermittent (INT) position (H, L), the low-speed (LOW) position (L, L), and the high-speed (HIGH) position (L, H).

Variable resistor 59 is installed within the vehicle compartment in order that the vehicle operator may set the wiper's intermittent pause period, and is connected to oscillation circuit 50. Variable resistor 59 and oscillation circuit 50 comprise the components of the oscillation means. Oscillation circuit 50 varies its oscillation frequencies by means of variable resistor 59's resistance value, whereupon the oscillation signal is input to microcomputer 5.

Oscillating circuit 50, to which is connected variable resistor 59, is a well-known type free running multivibrator circuit consisting of two transistors, 51 and 52; condenser 53; and resistors 54–58. Collector resistor 54 of transistor 52 is not directly grounded, but is grounded via variable resistor 59. The oscillating frequency of said free running multivibrator circuit is determined by means of the charge and discharge times of condenser 53, that is the charge times of resistor 54 and variable resistor 59, as well as the discharge time of resistor 55. The oscillation period is varied linearly by means of the resistance value of variable resistor 59. The oscillation frequency may be varied within the region of approximately 10 Hz to 60 Hz, while the constants for each component 51–58 of oscillation circuit 50 are selected with an output signal duty ratio of, at most, 50-to-50. The collector of transistor 51 is connected to input port P8 of microcomputer 5, and to which the output signal of oscillation circuit 50 is input. Speed auto switch 64, to which vehicle speed detector 63 is connected, is connected to microcomputer 5 input port P9 via diode 60, which is used to block reverse voltage. Connected to input port P9 are pull-up resistor 61 and diode 62 which is installed due to the released noise voltage. When speed auto switch 64 is closed, the speed signal from vehicle speed detector 63 is input to said input port P9.

Vehicle speed detector 63 generates a frequency pulse signal in proportion to vehicle speed. For example, a method may be utilized wherein the passage of a magnet, which is embedded in the drive shaft, is detected by a reed switch or other device. Speed-auto switch 64 allows selection of validation or override of the speed-sensitive function.

Washer motor 70 is connected to vehicle power source VB and washer switch 71, while one terminal or said washer switch 71 is grounded. When closed, washer switch 71 has an output capability consisting of a one-bit washer signal depending upon whether or not washer motor 70 has a grounded current flow.

The terminal connecting washer motor 70 and washer switch 71 is connected to microcomputer 5 input port P10 by way of reverse voltage blocking diode 72. Also connected to input port P10 are pull-up resistor 73 and diode 74 which is installed due to the release of surge voltage. When washer switch 71 is closed and washer motor 70 is actuated, a low level (L) washer signal is input to input port P10.

Housing-cancel switch 80 is a selection switch installed within the vehicle compartment is indicate selection of housing actuation validation or override. By making and breaking a single contact is has the capacity to output a one-bit housing-cancel signal.

One end of the housing-cancel switch 80 contact is grounded, while the other end is connected to both microcomputer 5 input port P11 via resistor 81, and pull-up resistor 82. When the housing function override is selected, a low level (L) cancel signal is input to input port P11.

Warning light 90 is a light-emitting diode installed in the instrument panel within the vehicle compartment. One end of said diode is connected to vehicle power source VB through the medium of resistor 91, while the other end of said diode is connected to the collector os transistor 92 within the control unit. The base of transistor 92 within the control unit. The base of transistor 92 is connected to microcomputer 5 output port P15 via resistor 93, while the emitter is grounded.

(DESCRIPTION OF MECHANISM)

Figure 5:
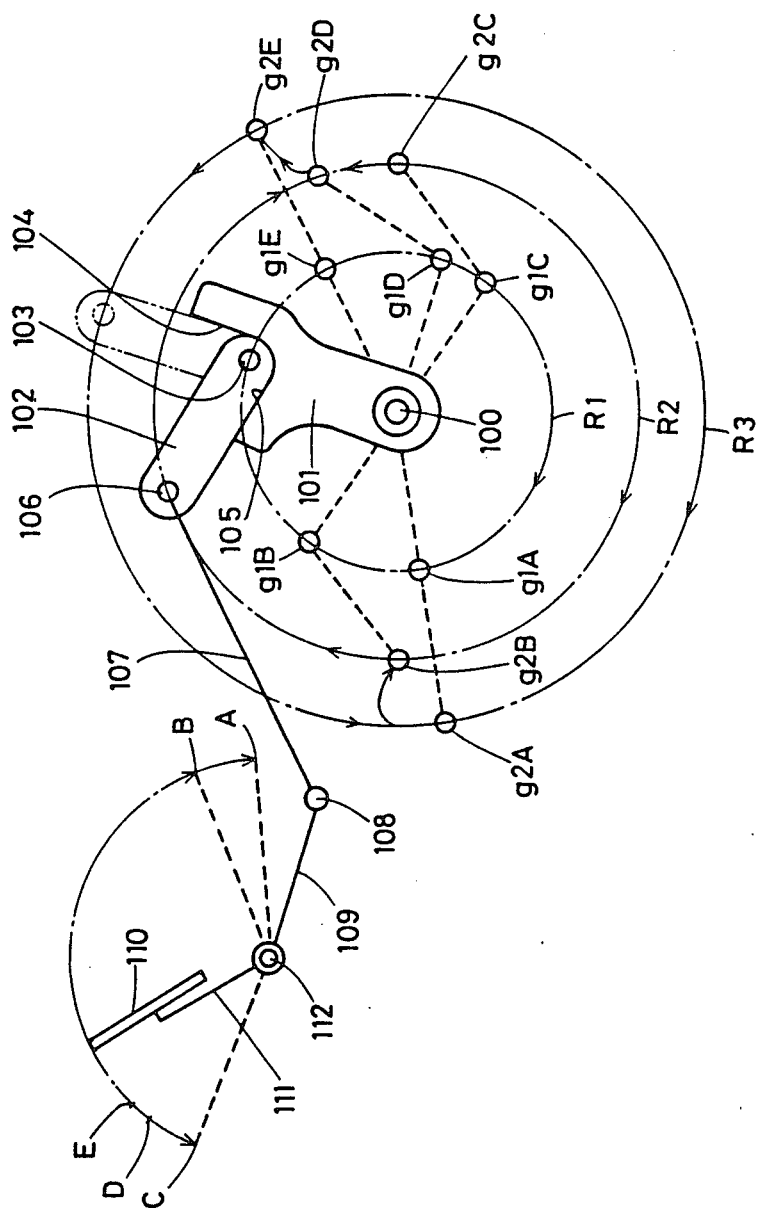
FIG. 5 offers a schematic of the wiper system mechanism.

FIG. 5 is a schematic drawing of the mechanism of the wiper system.

The first crank arm 101 is fastened to the output shaft 100 of the reduction gear-equipped wiper motor 1 so as to be unitized and thus revolve with it. The second crank arm 102 on the first crank arm 101 is so supported that it can oscillate with shaft 103 as its center. Second crank arm 102 has an oscillation area defined by retainer edge 104 and 105 on the first crank arm 101. Second crank arm 102 extends straight out is relation to first crank arm 101 so as to contact the retainer edge 104 in the extended condition, from which is flexed nearly 90 degrees to contact retainer edge 105 in the flexed condition.

Second crank arm 102 has a link rod 107 passing through the coupling shaft 106 on its end portion, and this link rod 107 is connected with coupling rod 109 through coupling shaft 108. Coupling rod 109 is secured to wiper arm 111, which is equipped with wiper blade 110 and so supported on oscillation shaft 112 as to oscillate freely.

Only when the first crank arm 101 has an angular orbit within the predetermined angle range in relation to the wiper motor is the second crank arm 102 free to oscillate in relation to first crank arm 101. In any other case, a lock mechanism (not illustrated) using a cam cuts in the lock the system into either the extended or flexed condition.

The operation of the wiper system mechanism is as follows.

In the retracted stop condition, wiper blade 110 is retracted and housed at retracted stop position A outside of the normal sweep range (between B and C). At this time first crank arm 101 is at the retracted stop position g1A, second crank arm 102 is in the fully extended position, and coupling shaft 106 is at retracted stop position g2A. The lock of the above-mentioned lock mechanism is in the released condition at this time. Hereinafter, the position of second crank arm 102 indicates the position of coupling shaft 106.

The wiper motor output shaft 100 is made to turn with forward rotation (clockwise on the figure schematic). When the first crank arm 101 is moved forward circumferentially from R1 retracted stop position g1A to intermittent pause position g1B, the second crank arm 102 rotates leftward with shaft 103 as its center under the reactionary ortational force drawing it from link rod 107, in the flexed condition. During this time second crank arm 102 moves from the retracted stop position g2A to intermittent pause position g2B, as a result of which wiper blade 110 ascends from retracted stop position A to intermittent pause position B.

Next, when the first crank arm 101 is rotated in the forward (clockwise) direction, the second crank arm 102 is rotated in the fully flexed condition, with coupling shaft 106 turning clockwise circum-ferentially around R2. As the clockwise motion continues, wiper blade 110 makes its sweep back and forth between intermittent pause position B and reverse position C. When said wiper blade reaches reverse position C, the first crank arm 101 position is 180 degrees from the intermittent pause position g1B at reverse position g1C, while second crank arm 102 is at position g2C.

In this way, by forward movement of wiper motor output shaft 100 with first crank arm 101 moving forward (clockwise), the normal sweeping action (high speed, low speed, intermittent) is performed.

To house the wiper blade 110, which is in the usual sweeping area (between position B and C), at the retracted stop position, the first crank arm 101 is reverse rotated (counterclockwise) from near the reverse position g1C to the retracted stop position g1A.

When the crank arm 101 reaches the reverse position g1C, the lock mechanism is released. Thus, when the reverse rotation begins, second crank arm 102 is made to rotate rightward with shaft 103 as its center under reactionary rotational force exerted by link rod 107. This changes the condition from flexed to extended, and the position shifts circumferentially from R2/g2C to %3/g2E. At such time the first crank arm 101 shifts from reverse position g1C up as far as position g1E, and wiper blade 110 moves slightly from reverse position C to position E.

While first crank arm 101 moves back (counterclockwise) from position g1E to intermittent pause position g1B and then to the retracted stop position g1A where it halts; second crank arm 102 is locked in the extended condition, moves counterclockwise circumferentially around R3, coming to a stop at the retracted stop position g2A. However, at this time the lock has been released. During this phase the wiper blade 110 is driven by a long, extended crank, passing from position E beyond the intermittent pause position B, coming to rest at the retracted stop position A.

(DESCRIPTION OF ACTUATION)

In the preferred embodiment a wiper system is assumed comprising a mechanism for a controlling wiper device which conducts normal wiping actuation by controlling the rotation of wiper motor 1 in the normal direction, and which varies the effective length of the crank arm connected to the wiper motor output shaft by controlling rotation in the reverse direction, and which houses the wiper arm and wiper blade in a prescribed housed position.

In order to realize the actuation based upon the aforesaid construction, reference is now made to the drawing which concerns the actual processing within microcomputer 5.

Figure 6:
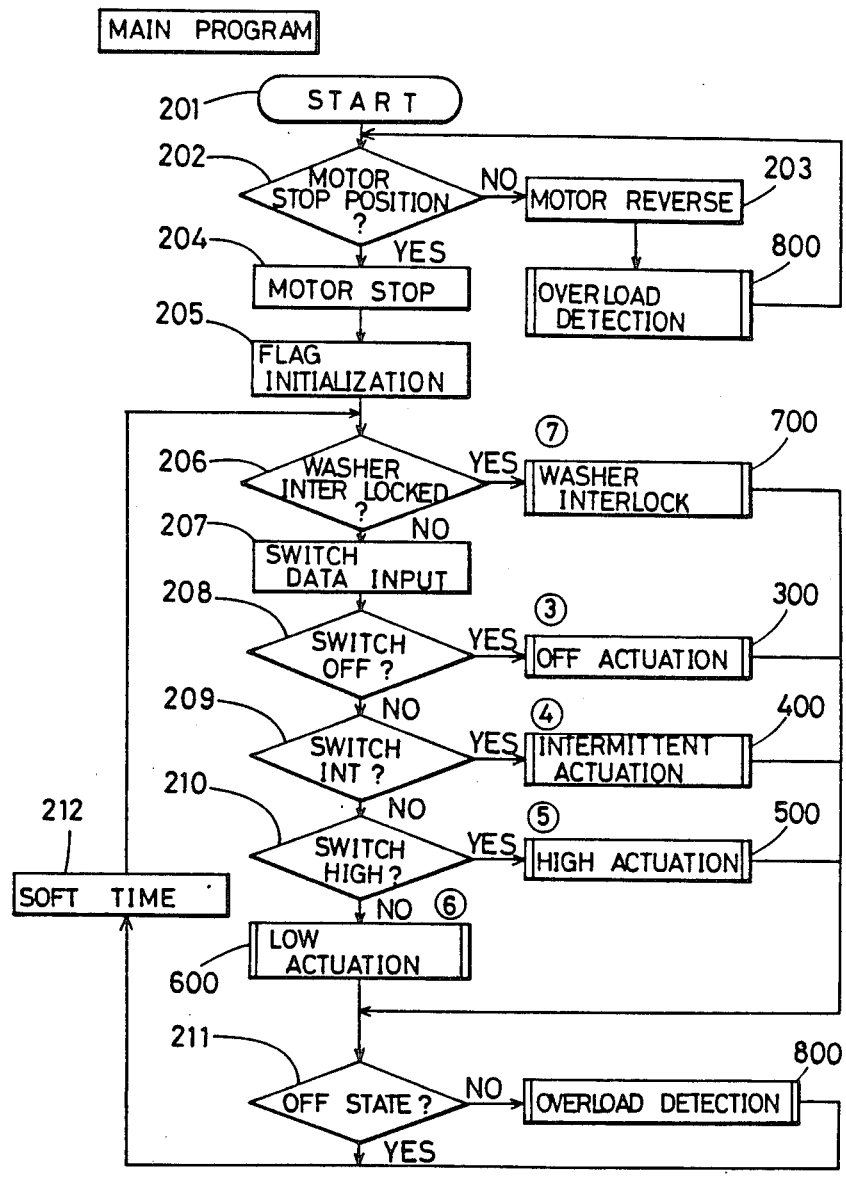
FIG. 6 is a flow chart illustrating main process in the microcomputer.

FIG. 6 is a flow chart illustrating the main program.

When power is input, and after the initialization routine which accompanies power input, the main program is initiated.

In step 202, a check is made to determine whether or not the output shaft 100 of the wiper motor 1 is at the housedstop position. If said output shaft is not at the housed-stop position, the program continued to step 203, output ports P1, P2 and P3 register (L, L, H) and reverse drive relay 23 is excited, whereupon wiper motor 1 commences low speed rotation in the reverse direction.

From step 203 the program enters overload detection subroutine 800. Said subroutine 800 shall be herein after described. From subroutine 800, the program is returned to step 202, and said output shaft 100 of the wiper motor 1 continues reverse rotation until arrival at said retracted-stop position.

Subsequent to said output shaft's arrival at said retracted stop position A, the program progresses from step 202 to step 204, whereupon output ports P1, P2 and P3 register (L, L, L) and wiper motor 1 halts.

In the process from step 202 to step 204, if the wiper blade 110 is not housed at the retracted stop position A when power is input, wiper motor 1 is temporarily actuated in reverse rotation and the housing operation at the retracted stop position A is realized. In the case when the keyswitch 12 has been cut in the previous cycle, cutting the power source and halting the wiper blade 110 during wiper actuation, the wiper blade 110 is moved temporarily to the retracted stop position A, regardless of the position of the wiper actuation switch 3, because the aforesaid process occurs without regard for the state (flexed or straight) of the crank arms 101, 102. Thereafter, to prevent inconvenience in actuation, there is an interlock function process. Subsequent to the completion of said interlock process, the program continues to step 205, wherein initialization of each flag is conducted.

Thereafter, in step 206, input port P10 is inspected to determine whether or not washer switch 71 is closed and washer motor 70 is under actuation. If said washer motor is under actuation, the program continues to washer interlock subroutine 700, while if said washer motor is not under actuation, the program continues to step 207.

Thereupon, in step 207, data in input ports P6 and P7 are read to determine the selection position of wiper actuation switch 3.

In steps 208, 209 and 210, said wiper actuation switch read data is checked. If wiper actuation switch 3 position selection reads retracted stop actuation (OFF) position data (H, H), then the program continues from step 208 to off actuation subroutine 300; if selection reads intermittent actuation (INT) position data (H, L), then the program continues from step 209 to intermittent actuation subroutine 400; if selection reads high speed actuation (HIGH) position data (L, H), then the program progresses from step 210 to high speed actuation subroutine 500; if the selection position data is none of the aforementioned three data configurations, the low speed actuation position is indicated by default and the program progresses from step 210 to low speed actuation subroutine 600.

When each of the above mentioned actuation subroutines 300–700 is completed, there is a return to the main program which continues to step 212 via step 211. In step 212, there is a pause for a prescribed period, for example just 0.1 seconds, then said step terminates and the program returns to step 206.

Thereafter, steps 206 to 212 are repeated. Washer switch 71 and wiper actuation switch 3 selections are inspected at each prescribed period determined in step 212, and processing is realized corresponding to said selection positions.

In step 211, the selection position of wiper actuation switch 3 was the retracted stop (OFF) position. Nevertheless, the output shaft 100 of the wiper motor 1 is checked to see if it is actually at the retracted stop position, that is, it is checked to see if it is in a completely off state via motor position detector 2. If said off state is indicated, the program returns to step 206 via step 212 206, while if said off state is not indicated, the return to step 206 occurs only after the running of overload detection subroutine 800.

(OFF ACTUATION)

Figure 7:
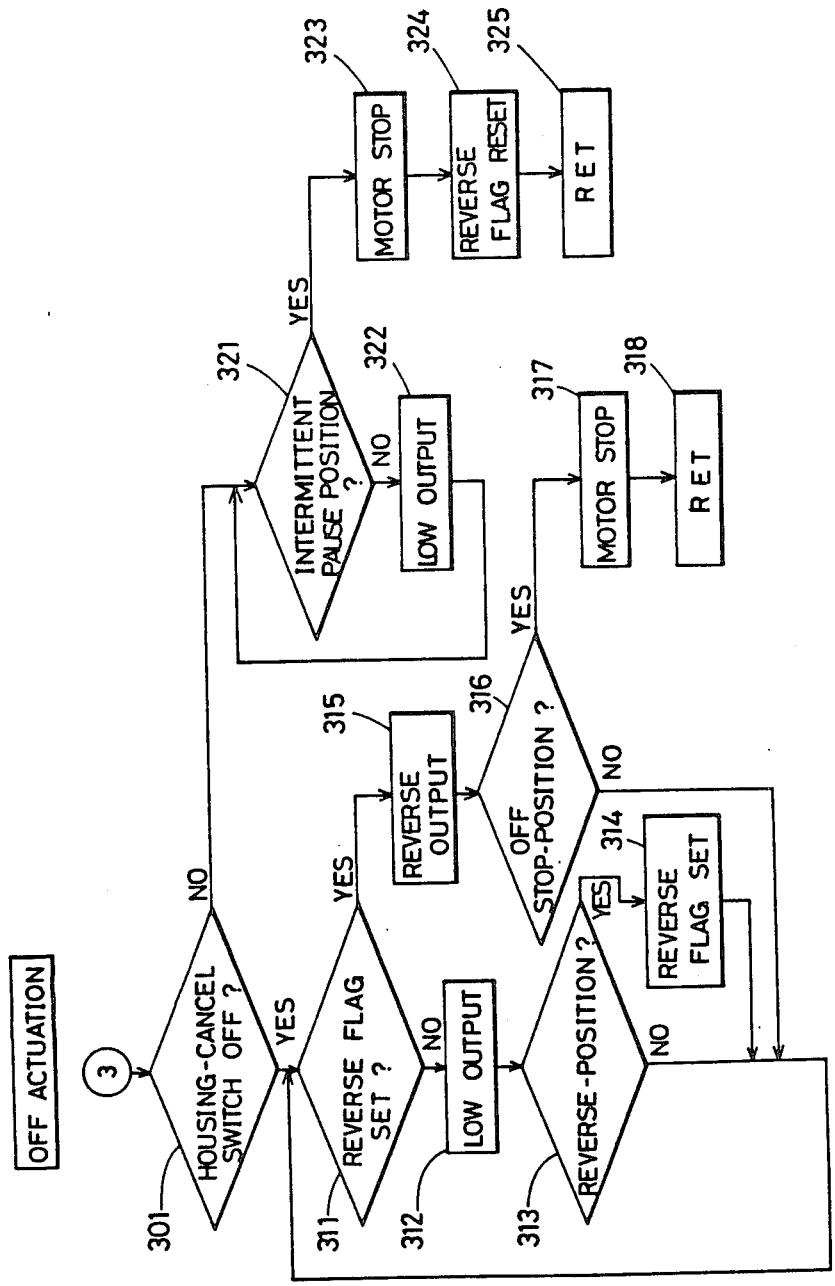
FIG. 7 is a flow chart illustrating an off actuation sub-routine.

FIG. 7 is a flow chart illustrating details of off actuation subroutine.

When wiper actuation switch 3 is transferred to retracted stop (OFF) position, the program progresses from step 208 of the main program to step 301 of retracted stop (OFF) actuation sub routine.

In step 301, input port P11 is inspected to see whether or not it registers (H), housing-cancel switch 80 is set at the off position, and housing actuation is checked to see if it has been selected. If housing actuation is selected, the program continues to step 311, housing-cancel switch 80 is set at the on position, and if housing actuation override has been selected, the program continues to step 321.

In step 311, the reverse flag, which indicates that the first crank arm 101 has arrived at reverse position g1C, is checked to see whether or not it has been set. Since initially, the reverse flag is reset, the program continues to step 312. In step 312, the data (H, L, L) is output from output ports P1, P2 and P3, forward drive relay 21 is excited, and wiper motor 1 begins normal low speed rotation. Whereupon, in step 313, input ports P4 and P5 are checked for (L, H) registration, and output shaft 100 is checked for arrival at reverse position g1C. If input ports P4 and P5 register (L, H) and the reverse position has been reached, then the program continued to step 314 and the reverse flag is set. If such is not the case, nothing is realized and the program returns to step 311.

As steps 311 to 313 are repeated, wiper motor 1 continues normal low speed rotation. When output shaft 100, namely crank arm 101, arrives at reverse position g1C, the reverse flag is set in step 314 and the program returns to step 311. Said reverse flag is for the purpose of verification that the first crank arm 101 arrives at reverse position g1C by normal rotation during housing actuation. Said flag is reset at the time selection of low speed and other actuations are realized. Said flag is set in flag initialization step 205.

This cycle, the program continues from step 311 to step 315 because the reverse flag is set.

In step 315, (L, L, H) data are output from output ports P1, P2 and P3, reverse drive relay 23 is excited, and wiper motor 1 rotates at low speed in the reverse direction. Whereupon, in step 316, input ports P4 and P5 are checked for (L, L) data, and wiper motor 1 output shaft 100 is checked for arrival at retracted stop position g1A. If output shaft 100 has not reached retracted stop position g1A, steps 311, 315 and 316 are repeated, wiper motor 1 reverse rotation continues. When retracted stop position g1A is reached, the program continues from step 316 to step 317. Thereupon, in step 317, output ports Pl, P2 and P3 register (L, L, L), wiper motor 1 halts, and in step 318, the program returns to step 212 via step 211 of the main program.

During retracted stop actuation, the first crank arm 101 temporarily rotates normally to reverse position g1C. After the process of reverse rotation to retracted stop position g1A is realized, via said process, at the moment wiper actuation switch 3 is transferred to retracted stop (OFF) position and regardless of the position of the first crank arm 101, the second crank arm 102 reliably enters a straightened state, and wiper blade 110 is reliably housed at retracted stop positon A.

Moreover, after retracted stop actuation is initiated, there is no return to the main program until the process is completed. During retracted stop actuation, even if wiper actuation switch 3 is transferred, the subsequent actuations are not realized until retracted stop actuation is completed. With the second crank arm 102 in the straightened state, moving to subsequent actuations, normal rotation or other inconveniences cannot occur.

When housing-cancel switch 80 is on and housing actuation override is selected, the program continues from step 301 to step 321.

In step 321 input ports P4 and P5 are checked for (H, L) data, and wiper motor 1 output shaft 100 is checked for arrival at intermittent pause position g1B. If said output shaft has not reached intermittent pause position g1B, the program continues to step 322, output ports P1, P2 and P3 register (H, L, L), wiper motor 1 rotates normally at low speed, previous steps 321 and 322 are repeated, and the arrival of output shaft 100 at intermittent pause position g1B is awaited. When said output shaft arrives at said intermittent pause position, the program progresses from step 321 to step 323, output ports P1, P2 and P3 register (L, L, L), and wiper motor 1 halts, whereupon, in step 324, the reverse flag is reset, and the program returns to step 212 via step 211 of the main program from step 325.

When housing-cancel switch 80 is on, housing-stop actuation is overridden, and wiper blade 110 halts at intermittent pause position B. Moreover, when wiper blade 110 is housed at retracted stop position A, housing-cancel switch 80 is cut-over to on position, and wiper blade 110 rises to intermittent pause position B where is halts.

The above described embodiment can be realized using one small sized contact switch with a change-over capacity to effectuate or override the housing function because it is controlled by microcomputer 5. Improvements and benefits include a simple and reliable control device circuit construction.

A further improvement of said embodiment is the selection of housing function override by using the housing-cancel switch 80. Said system also has the capability to make selections automatically by employing a temperature sensor to monitor external conditions.

(INTERMITTENT ACTUATION)

When the intermittent actuation (INT) position is selected by wiper actuation switch 3, the program continues from step 209 of the main program to step 401 of the intermittent actuation (INT) subroutine 400.

Figure 8:
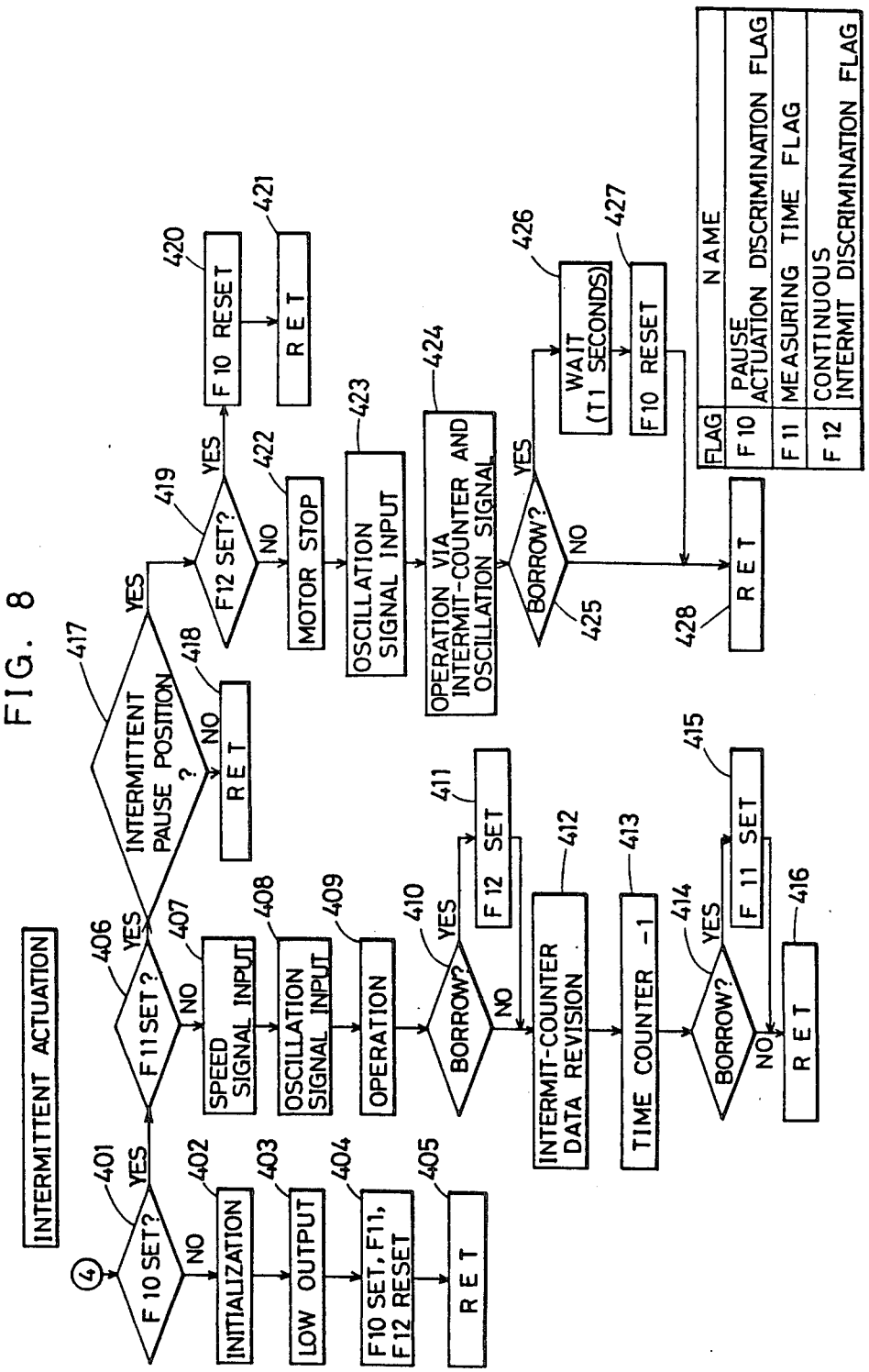
FIG. 8 is a flow chart illustrating an intermittent actuation sub-routine.

In step 401 of FIG. 8, the pause actuation discrimination flag F10 is checked to see whether or not it is set. Pause actuation discrimination flag F10 is reset at each complete circuit of the wiping actuation, and is used to discriminate the initial state of the intermittent actuation process. Because said flag was initially reset in step 205 of the main program, the program now continues to step 402.

In step 402, various initial set values are determined, for example the fixed value N is set for intermit-counter C INT. Fixed value N will correspond to the maximum value for the intermittent pause period, for example 12 seconds. Then, in step 403, output ports P1 P2 and P3 output (H, L, L) data, whereupon wiper motor 1 commences low speed rotation. In step 404, pause actuation discrimination flag F10 is set, measuring time flag F11 and intermit-continuation flag F12 are reset, the intermittent process preparation terminates, and the program returns from step 405 to step 212 via step 211 of the main program.

In step 212, after time-rest for a fixed period, for example 0.01 seconds, the program again enters step 401 of the intermittent actuation subroutine 400.

During the current cycle, the program continues to step 406 because pause actuation discrimination flag F10 has been set. In step 406, measuring time flag F11 is checked to see whether or not it is set. Measuring time flag F11 discriminates among time periods for measuring vehicle speed. During the current cycle the program continues to step 407 because said flag F11 was reset during the previous cycle.

In step 407, input port P9 is checked and a speed signal from vehicle speed detector 63 is input. In step 408, input port P8 is checked and an oscillation signal from oscillation circuit 50 is input. Whereupon, in step 409, the targeted intermittent pause period is calculated based upon the aforesaid signals. In step 410, the result of said calculation is checked to see if a borrow signal has been generated. If said borrow signal has been generated, the program continues to step 411 and continuous-intermit flag F12 is set to allow continuous intermittent actuation. Thereafter, in step 412, the newly calculated data is input to the intermit-counter memory. Processing in steps 407 through 412 includes feedback on rise-up of various signals, for example rising transition values for the speed signals (input port P9) and the oscillation signals (input port P8), wherein the rise of each signal is detected and on each respective occurrence, in step 402, the set value (N) of intermit-counter C is reduced by a value of one (1) and a new intermit-counter C value is determined, and wherein flag 12 is set if the intermit-counter value generates a borrow signal. Furthermore, when no rise transition is detected in the speed signals or oscillation signals, nothing is realized and the program continues to step 413.

In step 413, the value stored in the memory of the time counter, wherein the measuring time is calculated, is reduced by a value of one (1). The time counter's initial value was set in step 402. Then, in step 414, the time counter value is checked for generation of a borrow signal. If a borrow signal has not been generated, the measuring time is completed and the program continues to step 415, whereupon flag F11 is set. Then from step 416 the program returns to step 212 via step 211 of the main program.

Thus, in steps 406 through 416, the intermit-counter C value is varied in relation to the targeted intermittent pause period value which corresponds with the speed and variable resistor 59 set positions by merely repeating the fixed measuring period in the time counter. In the event vehicle speed requires continuous actuation, continuous intermit-flag F12 is set. These processes are realized during wiper motor 1 low speed rotation and wiper wiping actuation.

When the prescribed measuring time is completed, measuring time flag F11 is set, and in the intermittent actuation subroutine of the subsequent cycle the program continues from step 406 to step 417.

In step 417, input ports P4 and P5 are checked for (H, L) data, and wiper motor 1 is checked to see if it has arrived at the intermittent pause position B. If said shaft has not reached the intermittent pause position, the program continues to step 418 wherein the previous steps 401, 406, 417 and 418 are repeated until the intermittent pause position has been reached. When said intermittent pause position has been reached, the program progresses from step 417 to step 419.

In step 419, the continuous-intermit discrimination flag F12 is checked to see if it is set.

In the event said continuous-intermit flag F12 is set, the program continues to step 420 because the intermittent pause period registers zero (0) and continuous actuation is realized. Ie step 420, the pause actuation discrimination flag F10 is reset and from step 421 the program continus to step 212 via step 211 of the main program. During the intermittent actuation subroutine of the subsequent cycle, the program continues from step 401 to pre-step 402, the aforesaid processes are repeated, and wiper motor 1 continues low speed rotation.

In the event continuous-intermit discrimination flag F12 is not set, wiper motor 1 pauses at the intermittent pause position and intermittent actuation is realized, and the program continues to step 422. In step 422, output ports P1, P2 and P3 register (L, L, L) data and wiper motor 1 halts.

In step 423, input port P8 is checked and the oscillation signal is input, whereupon in step 424, the remaining pause period is operated based upon said oscillation signal and targeted intermittent pause period value which was calculated in step 409 and stored in the intermit-counter C memory. This operation is conducted by means of subtracting a value of one (1) from the intermit-counter C every time a rising transition is detected in the oscillation signal or speed signal. In step 425, the results of said operation are checked to see if a borrow signal has been generated, and if said borrow signal has not been generated, the program returns from step 428 to step 212 via step 211 of the main program. Therefore, in the intermittent actuation subroutine, the processes of steps 422 through 425 are repeated until the borrow signal is generated.

In the event a borrow signal is generated in response to the results of the aforesaid operations, the program continues from step 425 to step 426. In step 426, there is a time-rest of only the minimum intermittent pause period T1. Then in step 427, intermittent actuation discrimination flag F10 is reset, and the program returns from step 428 to the main program. The aforesaid minimum intermittent pause period T1 may be fixed at between 0.1 and 1 seconds. Thus, the final intermittent pause period operation occurs in steps 419 through 428.

During the intermittent actuation subroutine of the subsequent cycle, the program continues to pre-step 402 level because the pause actuation discrimination flag F10 has been reset, the above described processing repeats from the beginning, thus controlling the wiper's intermittent actuation.

Figure 9:
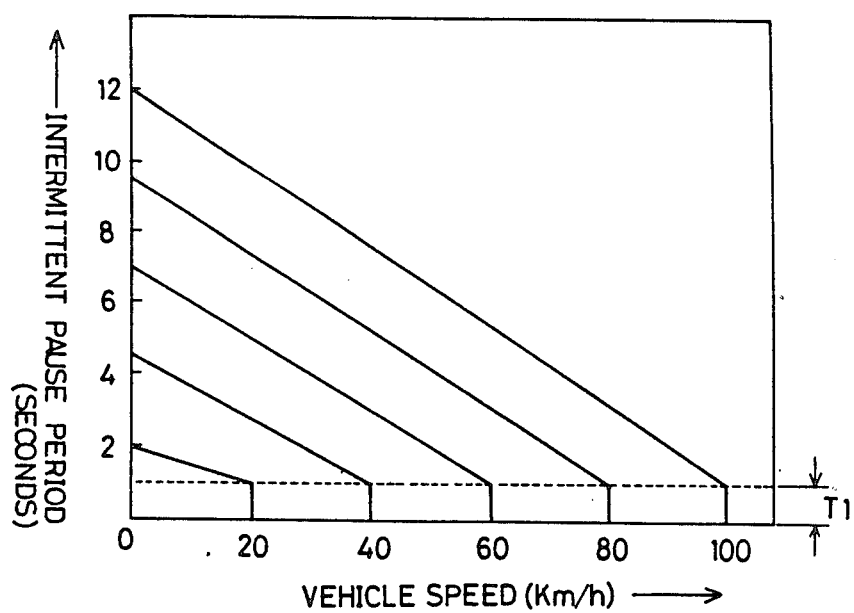
FIG. 9 is a chart illustrating the relationship between the intermittent pause period and vehicle speed.

FIG. 9 is a special chart wherein is illustrated the parameters of the relationship of the intermittent pause period and vehicle speed as designated by the operation position of variable resistor 59. In this example, the minimum intermittent pause period T1 is set at one (1) second. For example, if, when the vehicle is stopped, the position of variable resistor 59 is pre-set so that the intermittent pause period is set at seven (7) seconds, then when vehicle speed increases from 0–60 km/h, the intermittent pause period continually will adjust accordingly from seven (7) to one (1) seconds. Under conditions in which vehicle speed exceeds 60 km/h, there is an automatic conversion to continuous low speed actuation.

The embodiment of the present system herein above described possesses improvements which include a control system wherein the circuit construction is uncomplicated due to the utilization of microcomputer 5 as a control means. A further improvement includes a simple circuit construction wherein several input ports are not required, where only two input ports are installed which are used for the purpose of varying the intermittent pause period, namely input port P8, for input of the oscillation signal and input port P9, for input of the vehicle speed signal.

Improvements relating to functions include the capacity to convert automatically to continuous actuation when vehicle speed increases and the intermittent pause period shortens. A further improvement includes the capacity to allow the operator to freely vary the intermittent pause period by means of variable resistor 59 operation even when said vehicle is under speed-sensitive actuation.

This embodiment of the present device possesses improvements which include a means for setting a minimum intermittent pause period, thus preventing sudden repetition of on/off actuation due to an extremely short intermittent pause period, and thus also preventing excessive loads on wiper motor drive circuit 6 and wiper motor 1. A still further improvement includes improved comfort for the vehicle operator because the present device possesses the capability to precisely partition the wiper's intermittent pause time and the continuous actuation time.

Even further improvements of said embodiment include fewer mis-actuations due to oscillation signal loss because the duty ratio of the oscillation signal from the oscillation means is, at most, 50 to 50. Noise interference problems are also reduced.

An additional improvement of the present embodiment includes the capacity for the vehicle operator to easily override the speed-sensitive function by means of the speed-auto switch.

(HIGH ACTUATION)

FIG. 10 is a flow chart detailing the high-speed (HIGH) acutuation subroutine 500.

When the high-speed (HIGH) acutuation position is selected by means of the wiper actuation switch 3, we proceed from step 210 of the main program to the step 501 of the high-speed (HIGH) operation subroutine 500. IX step 501, with output ports P1, P2 and P3 at H, H and L, respectively, the forward drive relay 21 and high-speed changeover relay 22 are magnetized; the wiper motor 1 is made to turn at high speed in the forward direction, and in the next step 502 the reverse flag is set before moving from step 503 back to step 212 via step 211 of the main program. Then steps 501 through 503 are repeated, and the wiper motor 1 is actuated at high speed.

(LOW ACTUATION)

When the low-speed (LOW) actuation position is selected by means of the wiper actuation switch 3, we proceed from step 210 of the main program to the step 601 of the low-speed (LOW) actuation subroutine 600 shown in FIG. 11. In step 601, with output ports P1, P2 and P3 at H, L and L, respectively, only the forward drive relay 21 is magnetized, and the wiper motor 1 is actuated at low speed in the forward direction; then, in step 602, the reverse flag is reset and we move back to step 212 via step 211 of the main program from step 603. Thereafter, step 601 and 603 are repeated, and the wiper motor 1 is run at low speed.

In this manner, in accordance with the selected position of wiper actuation switch 3, the respective actuation can be performed.

(WASHER INTERLOCK ACTUATION)

Hereinafter follows a description of the actuation processing focused upon the operation of washer switch 71 when wiper blade 110 is housed in retracted stop position A.

As washer switch 71 is operated, the program progresses from step 206 of the main program to step 701 of washer interlock sub routine 700.

Figure 12:
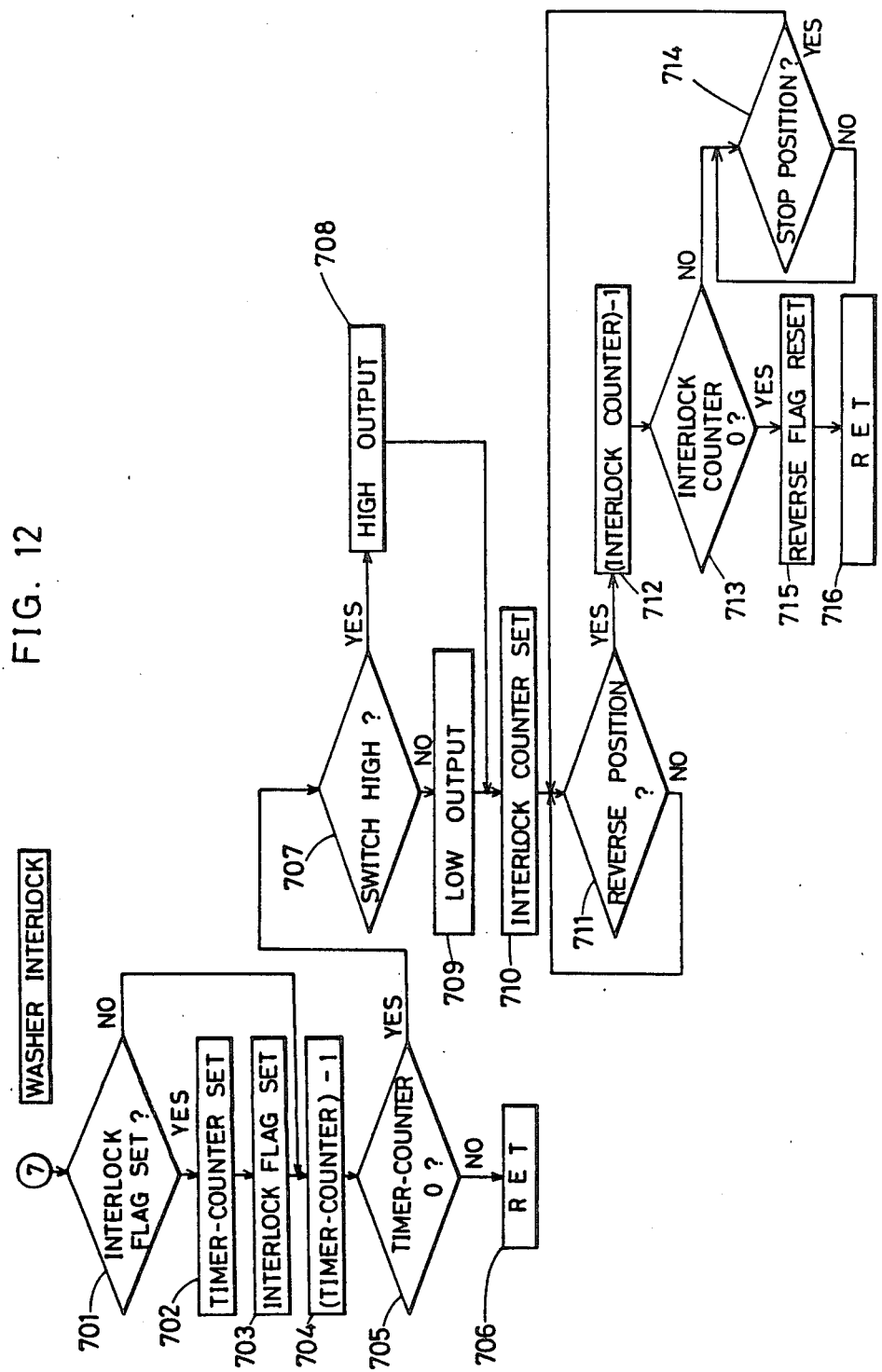
FIG. 12 is a flow chart illustrating the washer interlock sub-routine.

In step 701 of FIG. 12, the interlock flag is inspected to determine whether or not it has been set. The washer interlock flag is set when any actuation mode is actuated, other than the washer interlock actuation mode. Since said interlock flag is initially set, the program continues to step 702. In step 702, a fixed value is set in the timer-counter. Said fixed value is set in the region of 0.5 seconds. Thereupon, in step 703, the interlock flag is reset, and in step 704 a value of one (1) is subtracted from the timer-counter, and in step 705 the timer-counter value is inspected to determine whether or not it is a zero (0) value. If said value is not a zero (0) value, the program returns from step 706 to step 212 via step 211 of the main program. Thereafter, until the timer-counter value reaches a zero (0) value, steps 211, 212, 206, and steps 701, 704, 705 and 706 are repeated sequentially. Each time step 212 of the main program is passed through, there is a time-rest during which nothing is realized, for example if there is a fixed period time-rest of only 0.1 seconds and if the fixed value set in step 702 is five (5), then a time-rest period of approximately 0.5 seconds will be conducted during which no actuation will be realized. Said time-rest period is for the purpose of initiating wiper actuation after washer motor 70 is actuated and washing solution is actually discharged. Furthermore, when washer switch 71 is erroneously operated at extremely short periods, said time-rest function prevents wiper actuation When the timer-counter reaches a zero (0) value, the program continues from step 705 to step 707. In step 707, wiper actuation switch 3 is inspected to determine whether or not the selected position is the high speed actuation (HIGH) position. If high speed actuation has been selected, the program progresses to step 708 in order to continue wiping actuation under the same conditions. Whereupon, output ports P1, P2 and P3 register (H, H, L) data and forward drive relay 21 and high speed changeover relay 22 are excited, and wiper motor 1 commences high speed rotation in the normal direction. If an actuation mode other than high speed actuation is selected, the program continues to step 709, and output ports P1, P2 and P3 register (H, L, L) data, whereupon wiper motor 1 commences low speed actuation. Thus, wiper blade 110 is raised from retracted stop position A and wiper actuation is initiated.

The program continues to step 710, wherein a prescribed value, for example the value three (3), is set in the interlock counter which determines the wiper's wiping frequency during the washer interlock actuation period. Thereupon, in step 711, while input ports P4 and P5 are inspected, via wiper motor position detector 2, to determine whether or not they register (L, H) data, the arrival of wiper motor 1 output shaft 100 at reverse position g1C is awaited. When said output shaft 100 reaches said reverse position, the program continues to step 712 where the interlock value is reduced by a value of one (1). In step 713, the interlock counter is inspected to determine whether or not it is a zero (0) value. If said value is not a zero (0) value, the program continues to step 714 where, as input ports P4 and P5 are inspected to determine whether or not they register (H, L) data, the arrival of wiper motor 1 output shaft 100 at intermittent pause position g1B is awaited. When said output shaft reaches said intermittent pause position, the program again returns to step 711.

Thereafter, steps 711 to 714 are repeated sequentially, passage of wiper motor 1 output shaft 100 through reverse position g1C and intermittent pause position g1B is verified, and the number of wiping movements completed by the wiper are tabulated. When the number of completed wiping movements reaches the prescribed number set in step 710, the program continues from step 713 to step 715.

In step 715, the reverse flag is reset at the retracted stop position, and in step 716 a return is made to step 212 via step 211 of the main program. On this occasion, wiper motor 1 continued low speed rotation.

Thus, when washing solution is discharged via operation of washer switch 71, wiper actuation is slightly retarded, wiping action occurs with a fixed frequency, and the wiper blade can again be housed in the retracted stop position.

Furthermore, when washer switch 71 is operated during times of high speed or low speed actuations, the wiper motor 1 effectively contunues high or low speed actuations.

In addition, in the event washer switch 71 is operated during wiper intermittent actuation, for example even during the intermittent pause period, the wiper blade 110 will temporarily conduct a fixed number of wiping operations, after which is can again enter intermittent actuation. This capacity is possible because during intermittent actuation, processing continually rotates among main program steps 206 through 211 and 212 as well as intermittent actuation subroutine 400, thus when washer switch 71 is operated the washer interlock routine is immediately realized.

However, when washer switch 71 is operated during the wiper's housing actuation, the washer interlock actuation is not realized. This is because when the off actuation subroutine 300 is temporarily initiated, the program cannot return to the main program until completion of the housing actuation.

(OVERLOAD DETECTION ACTUATION)

Figure 13:
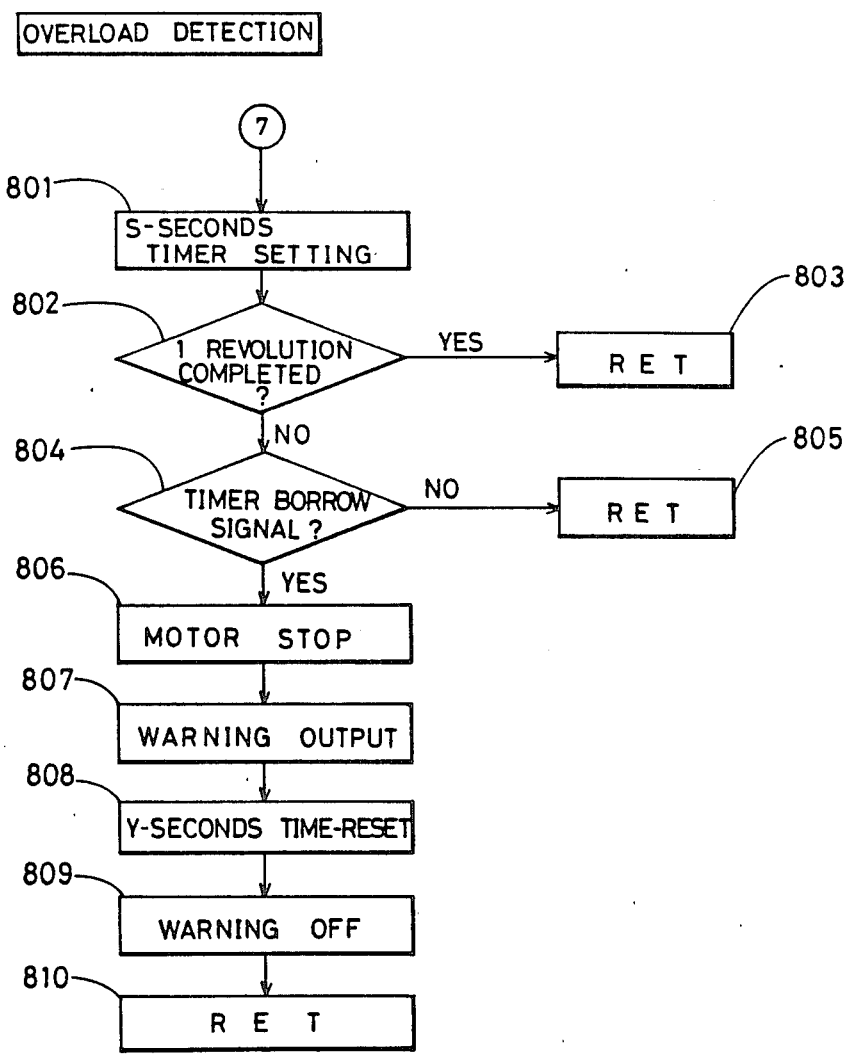
FIG. 13 shows a flow chart of the overload detection sub-routine.

FIG. 13 is a flow chart illustrating details of overload detection subroutine 800.

Subsequent to entering subroutine 800 from steps 203 or 211 of the main program, in step 801, the S seconds timer is initially set. This prescribed time period of S seconds is fixed at a value greater than is necessary for the time it takes wiper motor 1 to complete one revolution under normal load conditions. In step 802, a check is conducted to determine whether or not the wiper motor 1 output shaft 100 has made one revolution. If said output shaft has made one revolution, the program returns from step 803 to the prescribed step of the main program, while if said output shaft has not made one revolution, the program continues to step 804. Whether or not one revolution has been completed, a check is made, by means of position detector 2, to determine if said output shaft has travelled from the intermittent pause position through the reverse position and returned to the intermittent pause position. Thereupon, in step 804, a check is made to determine if time has expired for the S seconds timer and if a timer borrow signal has been generated. If said prescribed time period has not elapsed, the program returns from step 805 to the main program, while if said period has elapsed, the program continues to pre-step 806. In the processes from step 801 to step 804, checks are made to determine if the wiper motor 1 output shaft 100 completes one revolution within the prescribed S seconds. If one revolution has been completed by said output shaft, a return is made to the main program while in said state, while if one revolution has not been completed, the program continues the process of pre-step 806 overload time analysis.

In step 806, output ports P1, P2 and P3 output (L, L, L) data, relays 21, 22 and 23 all completely shut off, and current to wiper motor 1 is cut off. In step 807, output port P15 registers a high level (H) and the warning light 90 is illuminated. In step 808, there is a time-rest for a period of Y seconds. During said period of Y seconds a recovery time is required to cool wiper motor 1, said period of Y seconds shall not exceed 70 seconds. In step 809, output port P8 registers (L) and the warning light 90 is extinguished, whereupon the program returns from step 810 to the main program, the recovery period is completed, and thereafter, operation returns to normal.

Thus, when wiper motor 1 speed is reduced due to abnormally great overload conditions, the speed reduction is detected and the wiper motor 1 is stopped for a prescribed period, protecting said wiper motor from burnout. Furthermore, the vehicle operator is notified, without difficulty, that the wiper motor is stopped due to an overload via the warning light 90.

(SECOND EMBODIMENT OF OVERLOAD ACTUATION)

In the previous embodiment determination of an overload condition is made based upon the time required for the wiper motor 1 output shaft 100 to complete one revolution. However, it is also possible to make said determination based upon the time required for the variation of position signals from wiper motor position detector 2 which accompanies the rotation of wiper motor 1 output shaft 100. An example of this overload detection subroutine is illustrated in FIG. 14.

After entering said overload detection subroutine, in initial step 821, input ports P4 and P5 are checked and the two bit motor position data from position detector 2 are read. Thereupon, in step 822, the data stored in memory P concerning motor position during the previous cycle and motor position date M of the current cycle are checked for matching. If said data are not matched, the program continues to step 823 because the wiper motor 1 output shaft 100 rotates to the next position. L step 823, a prescribed value is set in timer-counter C, and in step 824, the motor position data M of the current cycle is entered into memory P. Thereupon, in step 825, a time-rest is initiated for a prescribed period, for example 0.1 seconds, and the program returns from step 826 to the main program.

In step 822, if the data stored in memory P concerning motor position during the previous cycle and motor position data M of the current cycle are matched, the program continues to step 827 because the wiper motor 1 output shaft 100 does not yet rotate to the next position. In step 827, a value of one (1) is subtracted from timer-counter C. In step 828, timer-counter C is checked for a zero (0) value. If said timer-counter does not register a zero (0) value, the program continues to step 824 because the prescribed period has not elapsed, while if said timer-counter does register a zero (0) value, the motor speed decreases due to the wiper motor 1 output shaft 100 staying in the same position past the prescribed time period, whereupon said wiper motor 1 is determined to be under an overload, and the program continues to the prestep 829 overload process. The processes occurring in steps 829 to 833 are identical to the processes occurring in steps 806 and 810, illustrated in FIG. 13, wherein during a prescribed time period (y seconds), wiper motor 1 current is cut, and the process of illuminating the warning light 90 is actuated As described above, the wiper control system of the present device, by employing the aforesaid construction, has the beneficial effect of protecting the wiper motor from overload without attachment to said wiper motor of a bimetal circuit breaker Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed

What is claimed is:

1. A concealed wiper system for a vehicle comprising a wiper motor having a mechanism which receives a wiper arm in a retracted stop position by a reverse rotation of the wiper motor, means of oscillation having an oscillation frequency which is varied by a variable resistor installed within the vehicle compartment and generating an output signal, a wiper actuation switch for selecting wiper actuation, a wiper motor-position detector for detecting wiper motor output shaft position and generating an output signal indicative thereof, means of control of intermittent actuation employing a microcomputer, and a wiper motor drive circuit responsive to the control means for driving said wiper arm, wherein an intermittent pause period of the intermittent actuation is determined by the control means based upon the signal from said wiper motor-position detector and the signal from said means of oscillation.

2. The concealed wiper system of claim 1, wherein the means of oscillation comprises an oscillating circuit having an output signal duty ratio of at most 50-to-50.

3. A concealed wiper system for a vehicle comprising a wiper motor having a mechanism to receive a wiper arm in a retracted stop position by a reverse rotation of the wiper motor; an oscillation means for generating an oscillation signal of variable frequency determined by a variable resistor installed within the vehicle compartment; a wiper motor position detector for generating an intermittent pause position signal determined by the wiper motor output shaft position; a wiper motor drive circuit which actuates said wiper motor; first operation means for operating the duration of a targeted intermittent pause period based upon said oscillation signals and vehicle speed signals originating from a vehicle speed detector which generates frequency pause signals corresponding to vehicle speed; second operation means for operating a final intermittent pause period duration based upon said targeted intermittent pause period, said oscillation signal, and said intermittent pause position signal; and control means for controlling said wiper motor drive circuit according to the final intermittent pause period duration.

4. The concealed wiper system claimed in claim 3 wherein the second operation means establishes continuous actuation when said targeted intermittent pause period duration is zero, and said second operation means establishes a predetermined minimum intermittent pause period duration when said targeted intermittent pause period duration is not zero.

5. The concealed wiper system of claim 3 wherein said oscillation means comprises an oscillation circuit having an oscillation signal duty ratio of, at most, 50 to 50.

6. The concealed wiper system of claim 3 further comprising a vehicle speed-auto switch for inputting the vehicle speed signal generated from the vehicle speed detector.

7. A concealed wiper system comprising a wiper motor having a mechanism to house a wiper arm in a retracted stop position by a reverse rotation of the wiper motor;
   a wiper actuation switch for generating a two-bit selection output signal corresponding to a selected switch position position when wiper actuation mode is selected;
   a washer switch for generating a one-bit output signal for actuating a washer motor and for indicating that said washer motor is actuated;
   a wiper motor position detector operatively connected to an output shaft of said wiper motor for generating a two-bit output signal which corresponds to the position of said output shaft;
   a control means employing a microcomputer for performing operation discrimination functions and for outputting actuation signals in response to the wiper actuation switch selection output signals and the washer switch signals and the wiper motor position signal and for directing the action of the wiper blade to occur with a prescribed frequency and in accordance with said washer switch signals; and
   a wiper motor drive circuit for driving said wiper motor in accordance with signals from the control means.

8. A concealed wiper system comprising a wiper motor having a mechanism to house a wiper arm in a retracted stop position by a reverse rotation of the wiper motor;
   a wiper actuation switch for generating a two-bit selection signal output corresponding to the selected switch position when wiper actuation mode is selected,
   a housing-cancel switch for generating a one-bit housing-cancel signal to override housing actuation,
   a wiper motor position detector for detecting wiper motor output shaft position, said detector generating a two-bit position output signal corresponding to the position of said output shaft,
   control means including a microcomputer which is responsive to said selection signals, housing-cancel signals, and position signals, said microcomputer generating normal and reverse rotation output signals, and
   a wiper motor drive circuit which actuates said wiper motor in response to the output signals from said control means.

9. A concealed wiper system comprising a wiper motor having a mechanism to house a wiper arm in a retracted stop position by a reverse rotation of the wiper motor;

a wiper actuation switch for generating a selection output signal corresponding to the selected switch position when wiper actuation mode is selected;

a wiper motor position detector for detecting the wiper motor shaft position and for generating output shaft position signals;

control means for outputting actuation signals in response to said selection output signals and said position signals;

a wiper motor drive circuit for applying current to said wiper motor in response to the actuation signals from said control means;

discrimination means for measuring a first time period required for wiper motor shaft rotation of a predetermined angle, said measurement being based upon said position signals, and said discrimination means determining whether or not said first time period exceeds a predetermined second time period;

and a stopping means for outputting a stop signal at a prescribed time to said wiper motor drive circuit in response to said discrimination means.

10. The concealed wiper system claimed in claim 9 further comprising a warning light which is illuminated in response to said discrimination means.

* * * * *